(12) United States Patent
Castelain

(10) Patent No.: US 9,173,112 B2
(45) Date of Patent: Oct. 27, 2015

(54) METHOD FOR TRANSFERRING DATA AND INFORMATION ENABLING AN ESTIMATE OF A WIRELESS LINK BETWEEN A SOURCE AND AT LEAST ONE RECEIVER

(75) Inventor: Damien Castelain, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 67 days.

(21) Appl. No.: 13/695,914

(22) PCT Filed: Apr. 27, 2011

(86) PCT No.: PCT/EP2011/056623
§ 371 (c)(1),
(2), (4) Date: Jan. 14, 2013

(87) PCT Pub. No.: WO2011/138199
PCT Pub. Date: Nov. 10, 2011

(65) Prior Publication Data
US 2013/0107975 A1    May 2, 2013

(30) Foreign Application Priority Data
May 3, 2010   (EP) .................................... 10161741

(51) Int. Cl.
*H04L 25/02*      (2006.01)
*H04W 24/02*      (2009.01)
*H04L 5/00*       (2006.01)
*H04L 27/26*      (2006.01)

(52) U.S. Cl.
CPC .............. *H04W 24/02* (2013.01); *H04L 5/005* (2013.01); *H04L 5/0007* (2013.01); *H04L 25/0202* (2013.01); *H04L 25/0232* (2013.01); *H04L 27/262* (2013.01); *H04L 27/2613* (2013.01)

(58) Field of Classification Search
CPC .............. H04W 24/02; H04L 25/0232; H04L 27/2613; H04L 27/262; H04L 5/0007; H04L 5/005; H04L 25/24; H04L 25/0202
USPC .......... 375/224, 285, 340, 346, 377; 370/491, 370/500
See application file for complete search history.

(56) References Cited

U.S. PATENT DOCUMENTS 8,340,220 B2 * 12/2012 Kimura et al. ................ 375/316
2005/0265490 A1 * 12/2005 Sestok et al. .................. 375/340
(Continued)

FOREIGN PATENT DOCUMENTS

EP          1 892 865       2/2008

OTHER PUBLICATIONS

3GPP TS 36.211 V8.4.0, "3$^{rd}$ Generation Partnership Project; Technical Specification Group Radio Access Network; Evolved Universal Terrestrial Radio Access (E-UTRA); Physical Channels and Modulation," Total 78 pages, (Sep. 2008).
(Continued)

*Primary Examiner* — Jean B Corrielus
(74) *Attorney, Agent, or Firm* — Oblon, McClelland, Maier & Neustadt, L.L.P.

(57) ABSTRACT

In a wireless communication system a frame composed of plural single carrier orthogonal frequency division multiplex symbols is transferred between a source and a receiver. The frame includes at least one hybrid symbol which is composed of at least one pilot sequence which is mapped on one subcarrier in two of at least a part of subcarriers on which the hybrid symbol is mapped and of discrete Fourier transformed data which are mapped on at least subcarriers comprised between two subcarriers on which the at least one pilot sequence is mapped. The at least one pilot sequence has the property that the variations of amplitudes obtained after performing a discrete Fourier transform over the at least one pilot sequence are limited. The frame also includes other symbols composed of discrete Fourier transformed data only.

4 Claims, 5 Drawing Sheets

(56) References Cited

U.S. PATENT DOCUMENTS

| | | | |
|---|---|---|---|
| 2006/0239178 A1* | 10/2006 | Svensson et al. | 370/208 |
| 2009/0059885 A1* | 3/2009 | Sadek et al. | 370/343 |
| 2009/0285327 A1* | 11/2009 | Iwai et al. | 375/295 |
| 2009/0323642 A1 | 12/2009 | Tanno et al. | |
| 2010/0046663 A1 | 2/2010 | Han et al. | |
| 2010/0118993 A1* | 5/2010 | Galda et al. | 375/260 |
| 2012/0020439 A1* | 1/2012 | Belveze et al. | 375/343 |

OTHER PUBLICATIONS

Kim, S.W., et al., "Physical layer verification for 3GPP LTE (FDD)," 11$^{th}$ International Conference on Advanced Communication Technology, pp. 1095-1100, (Feb. 15, 2009).

Prasad, R., et al., "Adaptive phy-mac design for broadband wireless systems," River Publishers, p. 239, (Oct. 1, 2009).

International Search Report Issued Aug. 24, 2011 in PCT/EP11/056623 Filed Apr. 27, 2011.

S.M. Alamouti, "A simple transmit diversity technique for wireless communications", published in *IEEE J. Select. Areas Communications*, vol. 16, pp. 1451-1458, Oct. 1998.

ETSI ETS 300 401 (second edition, May 1997).

ETSI EN 300 401 (V1.4.1, Jun. 2006), "Radio broadcasting systems; Digital Audio Broadcasting (DAB) to mobile, portable and fixed receivers".

\* cited by examiner

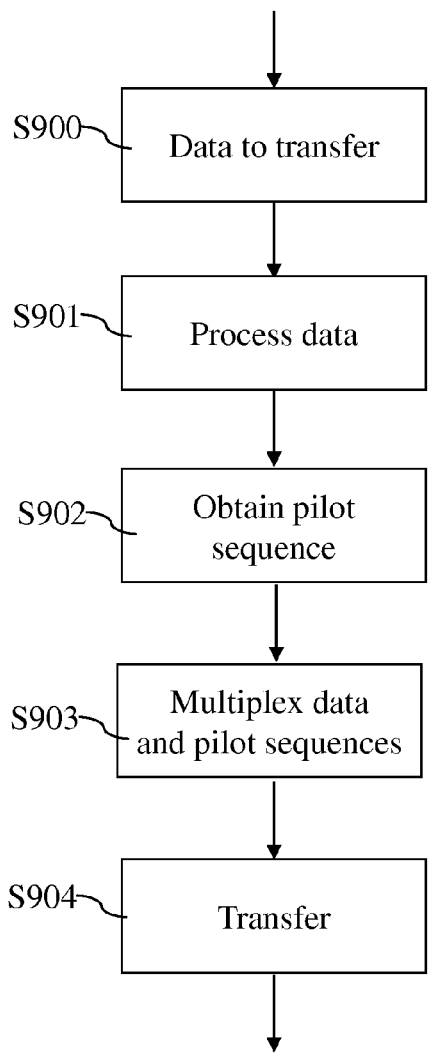
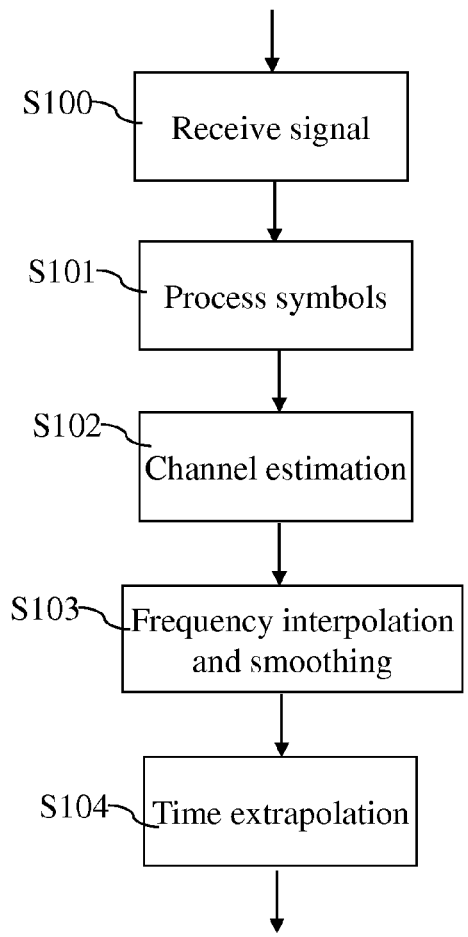
Fig. 9
Fig. 10

METHOD FOR TRANSFERRING DATA AND INFORMATION ENABLING AN ESTIMATE OF A WIRELESS LINK BETWEEN A SOURCE AND AT LEAST ONE RECEIVER

BACKGROUND OF THE INVENTION

1. Field of the Invention

The present invention relates generally to a method and a device for transferring data and information enabling an estimate of the wireless link between a source and a receiver using single carrier orthogonal frequency division multiplex scheme.

2. Description of Related Art

Single carrier orthogonal frequency division multiplex modulation scheme is a modulation scheme with orthogonal frequency division multiplex type multiplexing but single-carrier-like envelope. It can be implemented either in the time-domain or in the frequency-domain and is also called discrete Fourier transform spread orthogonal frequency division multiplex.

The main advantage with respect to orthogonal frequency division multiplex is that the discrete Fourier transform pre-coding restores the single carrier nature of the signal, i.e. a low peak to average power ratio.

Pilot sequences transmission is necessary for enabling the determination of an estimate of the wireless link between a source and a receiver. It is commonly considered that a pilot sequence cannot be scattered with single carrier orthogonal frequency division multiplex modulation scheme data without completely degrading the peak to average power ratio structure of the transmitted signal.

That's the reason why, in 3GPP TSG-RAN, "TR 25.814: "Physical Layer Aspects for Evolved UTRA", Version 7.1.0, 2006-09, pilot sequence is mapped on all the subcarriers, referenced as a pilot symbol. Such a pilot symbol is regularly inserted in the frame. In this case, a classical way of performing channel estimation is to estimate the channel at the pilot symbols positions and finally the channel is estimated at all positions by performing a time interpolation between two pilot symbols.

The drawback of this classical method appeared in the time interpolation. In order not to reduce the data throughput too much, one must limit the number of inserted pilot symbols. For example, if the pilot insertion rate is 1/12, it implies that a pilot symbol shall be inserted every twelve orthogonal frequency division multiplex symbols. This limits the capability of the system to follow the channel variations of the signal for example due to the Doppler effect.

According to the Nyquist theorem, if the orthogonal frequency division multiplex rate is 1/Ts, a bound on the maximum acceptable Doppler frequency is equal to:

$$f_{max} = \frac{1}{24T_s}$$

BRIEF SUMMARY OF THE INVENTION

This bound is due to the pilot structure itself and not to the related estimation method.

The present invention aims at providing a method and a device which enable a good following of the channel variation while preserving the low peak to average power ratio structure of single carrier orthogonal frequency division multiplex modulation scheme.

To that end, the present invention concerns a method for transferring data and information enabling an estimate of the wireless link between a source and at least one receiver using single carrier orthogonal frequency division multiplex scheme, characterised in that the method comprises the steps, executed for a given number of orthogonal frequency division multiplex modulated symbols, of:

forming one hybrid symbol which is composed of at least one pilot sequence which is mapped on one subcarrier in two of at least a part of subcarriers on which the hybrid symbol is mapped and of discrete Fourier transformed data which are mapped on at least subcarriers comprised between two subcarriers on which the at least one pilot sequence is mapped, at least one pilot sequence having the property that the variations of amplitudes obtained after performing a discrete Fourier transform over said at least one pilot sequence are limited, forming the other symbols by discrete Fourier transformed data only, performing an orthogonal frequency division multiplex modulation of the symbols in order to form the orthogonal frequency division multiplex modulated symbols, transferring the orthogonal frequency division multiplex modulated symbols.

The present invention also concerns a device for transferring data and information enabling an estimate of a wireless link between a source and at least one receiver using single carrier orthogonal frequency division multiplex scheme, characterised in that the device comprises:

means for forming one hybrid symbol which is composed of at least one pilot sequence which is mapped on one subcarrier in two of at least a part of subcarriers on which the hybrid symbol is mapped and of discrete Fourier transformed data which are mapped on at least subcarriers comprised between two subcarriers on which the at least one pilot sequence is mapped, at least one pilot sequence having the property that the variations of amplitudes obtained after performing a discrete Fourier transform over said at least one pilot sequence are limited, means for forming the other symbols by discrete Fourier transformed data only, means for performing an orthogonal frequency division multiplex modulation of the symbols in order to form orthogonal frequency division multiplex modulated symbols, means for transferring the orthogonal frequency division multiplex modulated symbols.

Thus, as hybrid symbol comprises data, the periodicity of hybrid symbols can be increased without reducing the data throughput, the channel variations are followed more efficiently while preserving the low peak to average power ratio structure of single carrier orthogonal frequency division multiplex modulation scheme.

The inventors have found that by mapping at least one pilot sequence which is mapped on one subcarrier in two of at least a part of subcarriers on which an hybrid symbol is mapped and by mapping discrete Fourier transformed data on at least subcarriers comprised between two subcarriers on which the at least one pilot sequence is mapped, the low peak to average power ratio structure of single carrier orthogonal frequency division multiplex modulation scheme is preserved.

According to a particular feature, the at least one pilot sequence is time shifted by half a sampling period.

Thus, the peak to average power ratio is improved.

The inventor has found that the global signal, in frequency or time dimensions, corresponds to the sum of two multiplexed signals, data and pilot sequences. As the interpolation is a linear process, the global interpolated signal corresponds also to the sum of two signals, the interpolated data signals and the interpolated pilot signals.

For the data in the time domain, if no interpolation is performed and if a x-phase shift keying constellation is used, a constant amplitude is obtained every sample period, and the maximum peaks after interpolation are placed just in-between these time instants. The same phenomenon occurs with the pilot sequence having the property that almost fixed amplitudes are obtained also after performing a discrete Fourier transform over said at least one pilot sequence which is shifted by an integer number of sampling periods.

Therefore, in this case, two signals are added, the peaks of which are placed at the same positions. By time shifting the pilot sequence of half a sampling period, the peaks of each signal are now interleaved. This implies that the peaks of the global signal, sum of both, are reduced.

If a non constant constellation is used, e.g. sixteen or sixty four quadrature amplitude modulation, the amplitude is no longer constant every sample period. However, the peaks will still be placed at the same positions, i.e. just in-between these time instants, and the peaks of the global signal will still be reduced by modifying the pilot sequence.

According to a particular feature, the at least one pilot sequence is a Zadoff-Chu sequence.

Thus, the peak to average power ratio is improved.

According to a particular feature, discrete Fourier transformed data are obtained from elementary symbols obtained by coding and modulating data, the elementary symbols being further discrete Fourier transformed.

According to a particular feature, a constellation shift of a predetermined value of degrees is performed for one elementary symbol in two.

Thus, the peak to average power ratio is improved.

According to a particular feature, the modulation is a Quadrature Phase Shift Keying modulation and predetermined value is equal to forty five.

Thus, the peak to average power ratio is improved.

According to a particular feature, the source has plural antennas for transferring the orthogonal frequency division multiplex modulated symbols.

Thus, the peak to average power ratio is improved in a multiple input transmission system.

According to a particular feature, for at least one hybrid symbol, the power allocated to subcarriers on which data are mapped is different from the power allocated to subcarriers on which a pilot sequence or sequences is or are mapped.

Thus, if the power allocated to subcarriers on which data are mapped is lower than the power allocated to subcarriers on which a pilot sequence or sequences is or are mapped, channel estimate is improved. Such characteristic is particularly effective in case of large delay spread.

Thus, if the power allocated to subcarriers on which data are mapped is upper than the power allocated to subcarriers on which a pilot sequence or sequences is or are mapped, interference on data is reduced. Such characteristic is particularly effective in case of small delay spread.

The present invention concerns also a method for estimating a wireless link between a source and a receiver using single carrier orthogonal frequency division multiplex scheme, characterised in that the method comprises the steps, executed for a given number of single carrier orthogonal frequency division multiplex symbols, of:

transforming the received symbols from the time domain to the frequency domain, for at least one hybrid symbol which is composed of at least one pilot sequence which is mapped on one subcarrier in two of at least a part of subcarriers on which the hybrid symbol is mapped and of discrete Fourier transformed data which are mapped on at least subcarriers comprised between two subcarriers on which the at least one pilot sequence is mapped, estimating the link on subcarriers on which the at least one pilot sequence is mapped, at least one pilot sequence having the property that the variations of amplitudes obtained after performing a discrete Fourier transform over said at least one pilot sequence are limited, for the at least one hybrid symbol which is composed of at least one pilot sequence which is mapped on one subcarrier in two of at least a part of subcarriers on which the hybrid symbol is mapped and of discrete Fourier transformed data which are mapped on at least subcarriers comprised between two subcarriers on which the at least one pilot sequence is mapped, estimating the channel response for all subcarriers by performing, a frequency interpolation and smoothing in order to allow an estimate of the channel on the subcarriers on which data are mapped, for the other symbols, estimating the channel response at least from the estimation performed for the hybrid symbol or from the estimations performed for the hybrid symbols.

The present invention concerns also a device for estimating a wireless link between a source and a one receiver using single carrier orthogonal frequency division multiplex scheme, characterised in that the device comprises:

means for transforming the received symbols from the time domain to the frequency domain, for at least one hybrid symbol which is composed of at least one pilot sequence which is mapped on one subcarrier in two of at least a part of subcarriers on which the hybrid symbol is mapped and of discrete Fourier transformed data which are mapped on at least subcarriers comprised between two subcarriers on which the at least one pilot sequence is mapped, means for estimating the link on subcarriers on which the at least one pilot sequence is mapped, at least one pilot sequence having the property that the variations of amplitudes obtained after performing a discrete Fourier transform over said at least one pilot sequence are limited, for the at least one hybrid symbol which is composed of at least one pilot sequence which is mapped on one subcarrier in two of at least a part of subcarriers on which the hybrid symbol is mapped and of discrete Fourier transformed data which are mapped on at least subcarriers comprised between two subcarriers on which the at least one pilot sequence is mapped, means for estimating the channel response for all subcarriers by performing a frequency interpolation and smoothing in order to allow an estimate of the channel on the subcarriers on which data are mapped, for the other symbols, means for estimating the channel response at least from the estimation performed for the hybrid symbol or from the estimations performed for the hybrid symbols.

Thus, as hybrid symbol comprises data, the periodicity of hybrid symbols can be increased without reducing the data throughput, the channel variations are followed more efficiently while preserving the low peak to average power ratio structure of single carrier orthogonal frequency division multiplex modulation scheme.

The inventors have found that by mapping at least one pilot sequence which is mapped on one subcarrier in two of at least a part of subcarriers on which an hybrid symbol is mapped and by mapping discrete Fourier transformed data on at least subcarriers comprised between two subcarriers on which the at least one pilot sequence is mapped, the low peak to average power ratio structure of single carrier orthogonal frequency division multiplex modulation scheme is preserved.

The present invention concerns also a frame composed of plural single carrier orthogonal frequency division multiplex symbols, characterised in that the frame is composed of:
- at least one hybrid symbol which is composed of at least one pilot sequence which is mapped on one subcarrier in two of at least a part of subcarriers on which the hybrid symbol is mapped and of discrete Fourier transformed data which are mapped on at least subcarriers comprised between two subcarriers on which the at least one pilot sequence is mapped, at least one pilot sequence having the property that the variations of amplitudes obtained after performing a discrete Fourier transform over said at least one pilot sequence are limited,
- other symbols composed of discrete Fourier transformed data only.

Thus, as hybrid symbol comprises data, the periodicity of hybrid symbols can be increased without reducing the data throughput, the channel variations are followed more efficiently while preserving the low peak to average power ratio structure of single carrier orthogonal frequency division multiplex modulation scheme.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the methods and apparatus according to the invention, they will not be repeated here.

BRIEF DESCRIPTION OF THE DRAWINGS

The characteristics of the invention will emerge more clearly from a reading of the following description of an example embodiment, the said description being produced with reference to the accompanying drawings, among which:

FIG. 9 discloses an example of an algorithm executed by a source according to the present invention;

FIG. 10 discloses an example of an algorithm executed by a destination according to the present invention;

DETAILED DESCRIPTION OF THE INVENTION

Figure 1:
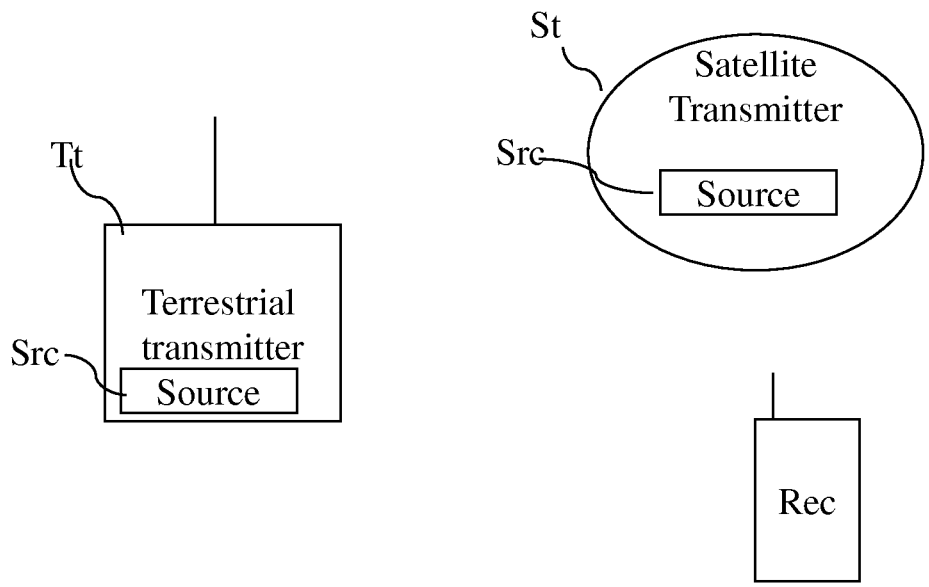
FIG. 1 represents a wireless link in which the present invention is implemented.

FIG. 1 represents a wireless link in which the present invention is implemented.

The present invention will be disclosed in an example in which the signals transferred by a source Src are broadcasted to receivers Rec. A source Src may be included in a satellite St or in a terrestrial transmitter Tt.

Only one satellite St and one terrestrial transmitter St are shown in the FIG. 1 for the sake of simplicity, but the wireless link may comprise a more important number of satellites St and/or of terrestrial transmitters St.

Only one receiver Rec is shown in the FIG. 1 for the sake of simplicity, but signals are broadcasted to a more important number of receivers Rec.

The receiver Rec may be a mobile terminal to which data like video signals are broadcasted.

Data and information enabling an estimate of the wireless link between a source and a one receiver are transferred using single carrier orthogonal frequency division multiplex scheme (SC-OFDM).

According to the invention, the source Src:
forms one hybrid symbol which is composed of at least one pilot sequence which is mapped on one subcarrier in two of at least a part of subcarriers on which the hybrid symbol is mapped and of discrete Fourier transformed data which are mapped on at least subcarriers comprised between two subcarriers on which the at least one pilot sequence is mapped, at least one pilot sequence having the property that the variations of amplitudes obtained after performing a discrete Fourier transform over said at least one pilot sequence are limited,
forms the other symbols by discrete Fourier transformed data only,
performs an orthogonal frequency division multiplex modulation of the symbols in order to form the orthogonal frequency division multiplex modulated symbols,
transfers the orthogonal frequency division multiplex modulated symbols.

According to the invention, the receiver Rec:
spreads in the frequency domain received symbols,
for at least one hybrid symbol which is composed of at least one pilot sequence which is mapped on one subcarrier in two of at least a part of subcarriers on which the hybrid symbol is mapped and of discrete Fourier transformed data which are mapped on at least subcarriers comprised between two subcarriers on which the at least one pilot sequence is mapped, estimates the link on subcarriers on which the at least one pilot sequence is mapped, at least one pilot sequence having the property that the variations of amplitudes obtained after performing a discrete Fourier transform over said at least one pilot sequence are limited,
for the at least one hybrid symbol which is composed of at least one pilot sequence which is mapped on one subcarrier in two of at least a part of subcarriers on which the hybrid symbol is mapped and of discrete Fourier transformed data which are mapped on at least subcarriers comprised between two subcarriers on which the at least one pilot sequence is mapped, estimates the channel response for all subcarriers by performing a frequency interpolation and smoothing in order to allow an estimate of the channel on the subcarriers on which data are mapped, for the other symbols, estimates the channel response at least from the estimation performed for the hybrid symbol or for the estimations performed for the hybrid symbols.

Figure 2:
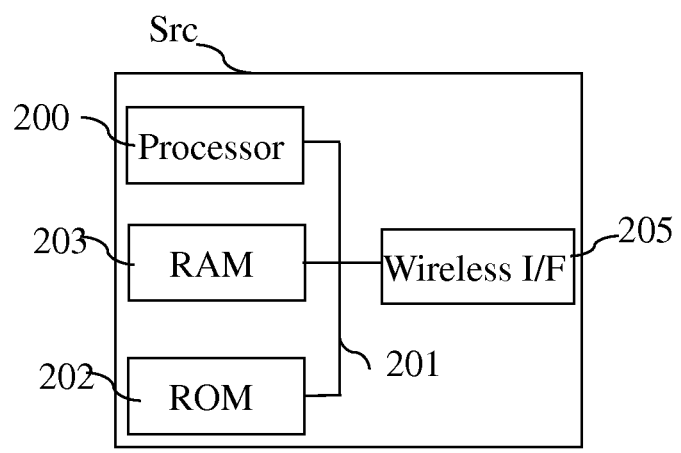
FIG. 2 is a diagram representing the architecture of a source in which the present invention is implemented.

FIG. 2 is a diagram representing the architecture of a source in which the present invention is implemented.

The source Src has, for example, an architecture based on components connected together by a bus 201 and a processor 200 controlled by the program as disclosed in FIG. 9.

It has to be noted here that the source Src may have an architecture based on dedicated integrated circuits.

The bus 201 links the processor 200 to a read only memory ROM 202, a random access memory RAM 203 and a wireless interface 205.

The memory 203 contains registers intended to receive variables and the instructions of the program related to the algorithm as disclosed in FIG. 9.

The processor 200 controls the operation of the wireless interface 205.

The read only memory 202 contains instructions of the program related to the algorithm as disclosed in FIG. 9, which are transferred, when the source Src is powered on, to the random access memory 203.

The wireless interface 205 comprises means for transferring multiplexed data and at least one pilot sequence according to the invention to at least one receiver Rec.

Figure 3:
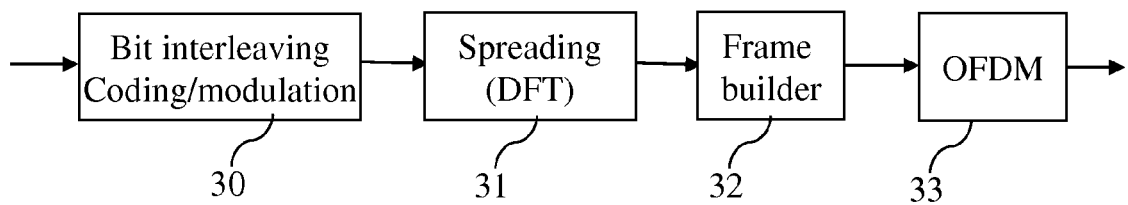
FIG. 3 discloses a block diagram of components of the wireless interface of the source.

The wireless interface 205 comprises components as disclosed in FIG. 3.

FIG. 3 discloses a block diagram of components of the wireless interface of the source.

Data to be transmitted are interleaved coded and organized as elementary symbols by the coding and modulation module 30 giving a set of elementary symbols.

In a variant of realization, the coding and modulation module performs a constellation shift of a predetermined value of degrees for one elementary symbol in two.

If the modulation is a Quadrature Phase Shift Keying modulation, the predetermined value is equal to forty five.

Then, the elementary symbols are spread in the frequency domain by the DFT (Discrete Fourier Transform) module 31. In a variant, the DFT module is replaced by a Fast Fourier Transform module or any other processing module.

The elementary symbols spread in the frequency domain are mapped on subcarriers comprised in the frequency band by a frame builder 32 which merges spread elementary symbols and at least one pilot sequence and maps the merged spread elementary symbols and the at least one pilot sequence on subcarriers comprised in the frequency band. The frame builder 32 will be disclosed in more detail in reference to FIG. 4.

The signal provided by the frame builder 32 is processed by the OFDM modulation module 33 prior to be transferred through one or plural antennas.

An optional cyclic prefix insertion module, not shown in FIG. 3, can be applied before transmission through the antenna of the source Src.

A SC-OFDM symbol is obtained by spreading elementary symbols of data by a first spreading module from the time domain to the frequency domain, by merging or not the spread elementary symbols with at least one pilot sequence and by modulating the merged spread elementary symbols or the spread elementary symbols using an orthogonal frequency division multiplex module.

Figure 4:
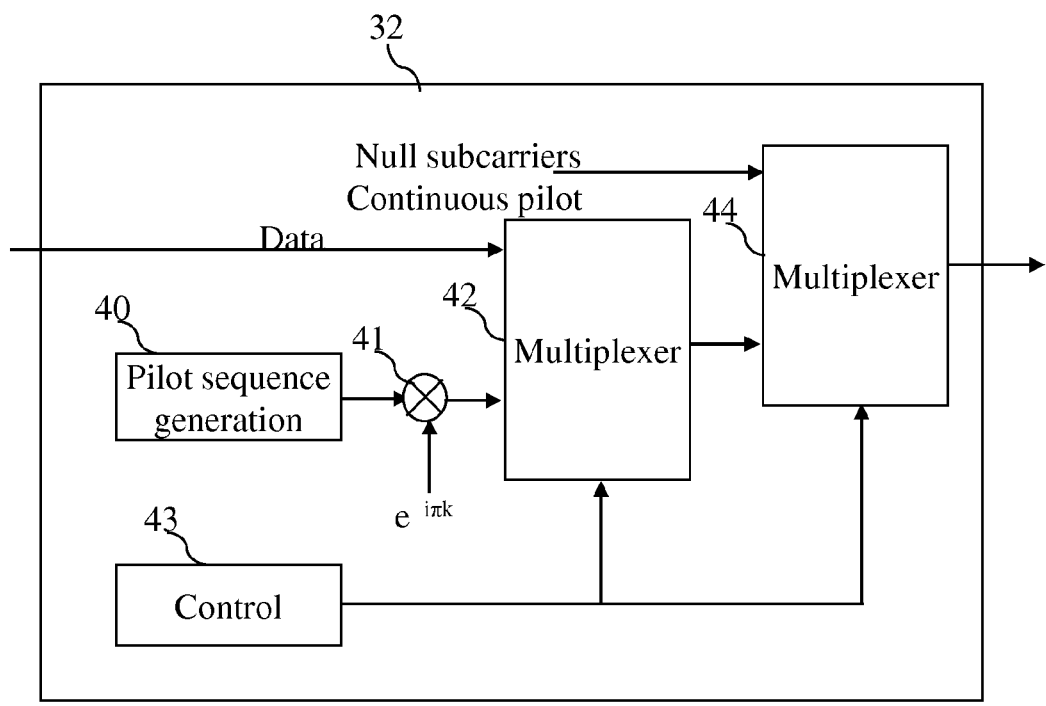
FIG. 4 discloses a block diagram of frame builder of the source according to the present invention.

FIG. 4 discloses a block diagram of frame builder of the source according to the present invention.

The frame builder 32 comprises a pilot sequence generation module 40. The pilot sequences have the property that almost fixed amplitudes are obtained also after performing a DFT over such sequences, i.e. pilot sequences have the property that the variations of amplitudes obtained after performing a discrete Fourier transform over said at least one pilot sequence are limited.

Variations of amplitude are limited if the amplitude is constant or varies at most from plus fifty percent from the average amplitude value.

It has to be noted here that the amplitude is an absolute value not a power of two values.

For example, pilot sequences are pilot sequences like Zadoff-Chu sequences. Zadoff-Chu sequences are parameterised by three integers N, p and l.

Zadoff-Chu sequences are derived from the following formula:

$$N \text{ even}: x_k = e^{-i\frac{2\pi}{N}\left(p\frac{k^2}{2}+lk\right)}$$
$$N \text{ odd}: x_k = e^{-i\frac{2\pi}{N}\left(p\frac{k(k+1)}{2}+lk\right)}$$

Where N is the length of the sequence, p is the index of the sequence and l is the (time) shift of the sequence.

If l equals to zero, the sequence is known as the root (p) sequence.

Zadoff-Chu sequences offer several interesting characteristics like a perfect autocorrelation, good intercorrelation by varying p and l and low envelope fluctuation in both time and frequency dimensions.

In a variant, the at least one pilot sequence is as the one disclosed in the document of ETSI ETS 300 401 (second edition, May 1997) or ETSI EN 300 401 (V1.4.1, June 2006), "Radio broadcasting systems; Digital Audio Broadcasting (DAB) to mobile, portable and fixed receivers".

According to a particular mode of realization of the present invention, the frame builder 32 comprises half period shift module 41 for shifting the pilot sequences by half a sampling period duration.

For the example, if Zadoff-Chu sequences are used, the sequences provided by the half period shift module 41 is as follows:

$$N \text{ even}: x_k = e^{-i\frac{2\pi}{N}\left(p\frac{k^2}{2}+lk+0.5k\right)}$$
$$N \text{ odd}: x_k = e^{-i\frac{2\pi}{N}\left(p\frac{k(k+1)}{2}+lk+0.5k\right)}$$

A time shift of half a sample period corresponds in the frequency domain to a phase slope equal to $-\pi k/N$.

It has to be noted here that the sequences provided by the half period shift module 41 may also be as follows:

$$N \text{ even}: x_k = e^{-i\frac{2\pi}{N}\left(p\frac{k^2}{2}+lk-0.5k\right)}$$
$$N \text{ odd}: x_k = e^{-i\frac{2\pi}{N}\left(p\frac{k(k+1)}{2}+lk-0.5k\right)}.$$

The shifted pilot sequences are multiplexed with data by a multiplexer 42.

According to the invention, within given number of SC-OFDM symbols, one hybrid symbol is composed of at least one pilot sequence which is mapped on one subcarrier in two of at least a part of subcarriers on which the hybrid symbol is mapped and of discrete Fourier transformed data which are mapped on at least subcarriers comprised between two subcarriers on which the at least one pilot sequence is mapped. The other symbols are composed of data only.

Figure 5:
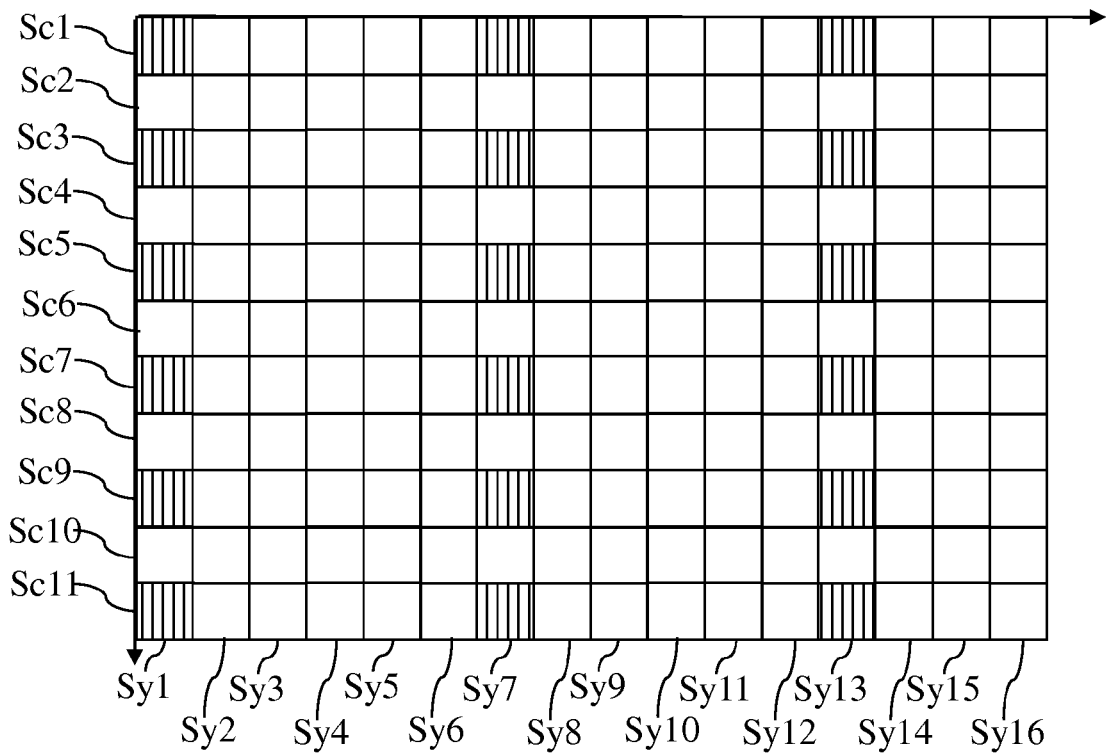
FIG. 5 discloses an example of the multiplexing of pilot sequences and data according to the present invention.

An example of such multiplexing is shown in FIG. 5.

FIG. 5 discloses an example of the multiplexing of pilot sequences and data according to the present invention.

On the horizontal axis, representing the time domain, plural SC-OFDM symbols noted Sy1 to Sy16 are represented.

The vertical axis represents the subcarriers Sc1 to Sc11 on which SC-OFDM symbols are mapped.

FIG. 5 shows an example wherein eleven subcarriers are shown. The present invention is also applicable when there are more or less subcarriers.

The squares filed by vertical hatching represent the subcarriers on which, for a given SC-OFDM symbol, at least one pilot sequence is mapped.

The other squares represent the subcarriers on which data are mapped.

In the Example of FIG. 5, within six SC-OFDM symbols, one SC-OFDM symbol is composed of at least one shifted pilot sequence which is mapped on one subcarrier on two of the subcarriers on which the SC-OFDM symbol is mapped. Data are mapped on the other subcarriers.

The SC-OFDM symbols Sy1, Sy7 and Sy13 are composed of at least one pilot sequence which is mapped on the subcarriers Sc1, Sc3, Sc5, Sc7, Sc9 and Sc11 and of data which are mapped on subcarriers Sc2, Sc4, Sc6, Sc8 and Sc10.

It has to be noted here that the same pilot sequence may be mapped on subcarriers Sc1, Sc3, Sc5, Sc7, Sc9 and Sc11 of SC-OFDM symbols Sy1, Sy7 and Sy13 or different pilot sequences may be mapped on subcarriers Sc1, Sc3, Sc5, Sc7, Sc9 and Sc11 of SC-OFDM symbols Sy1, Sy7 and Sy13.

It has to be noted here that for at least one symbol Sy1, Sy7 and Sy13, the power allocated to subcarriers may be not equally distributed.

For example, for subcarriers Sc2, Sc4, Sc6, Sc8 and Sc10, the power allocated to these subcarriers is higher than the power allocated to subcarriers Sc1, Sc3, Sc5, Sc7, Sc9 and Sc11 of at least one SC-OFDM symbol Sy1, Sy7 and Sy13 i.e. more power is allocated for data than for pilot sequence or sequences.

For example, for subcarriers Sc1, Sc3, Sc5, Sc7, Sc9 and Sc11, the power allocated to these subcarriers is higher than the power allocated to subcarriers Sc2, Sc4, Sc6, Sc8 and Sc10 of at least one SC-OFDM symbol Sy1, Sy7 and Sy13 i.e. more power is allocated for pilot sequence or sequences than for data.

The SC-OFDM symbols Sy2 to Sy6, Sy8 to Sy12 and Sy14 to Sy16 are composed of data which are mapped on subcarriers Sc1 to Sc11.

The frame builder 32 comprises another multiplexer 44 which multiplexes the output of the multiplexer 44 with null data and/or with continuous pilot sequences.

The multiplexing is controlled by the controller 43.

The present invention is also applicable in multiple input multiple output (MIMO) transmission scheme like for example the one proposed by S. M. Alamouti, in the paper entitled "A simple transmit diversity technique for wireless communications", published in *IEEE J. Select. Areas Communications*, vol. 16, pp. 1451-1458, October 1998 with two or more transmit antennas.

Different Zadoff-Chu sequences may be used for the different antennas. In the two-antenna case, if $x_k$ is the pilot sequence defined in the frequency domain, wherein k is the subcarrier index transmitted by a first antenna, the second antenna transmits the pilot sequence $(-1)^k x_k e^{j\theta}$ where θ is a predetermined constant value.

Figure 6:
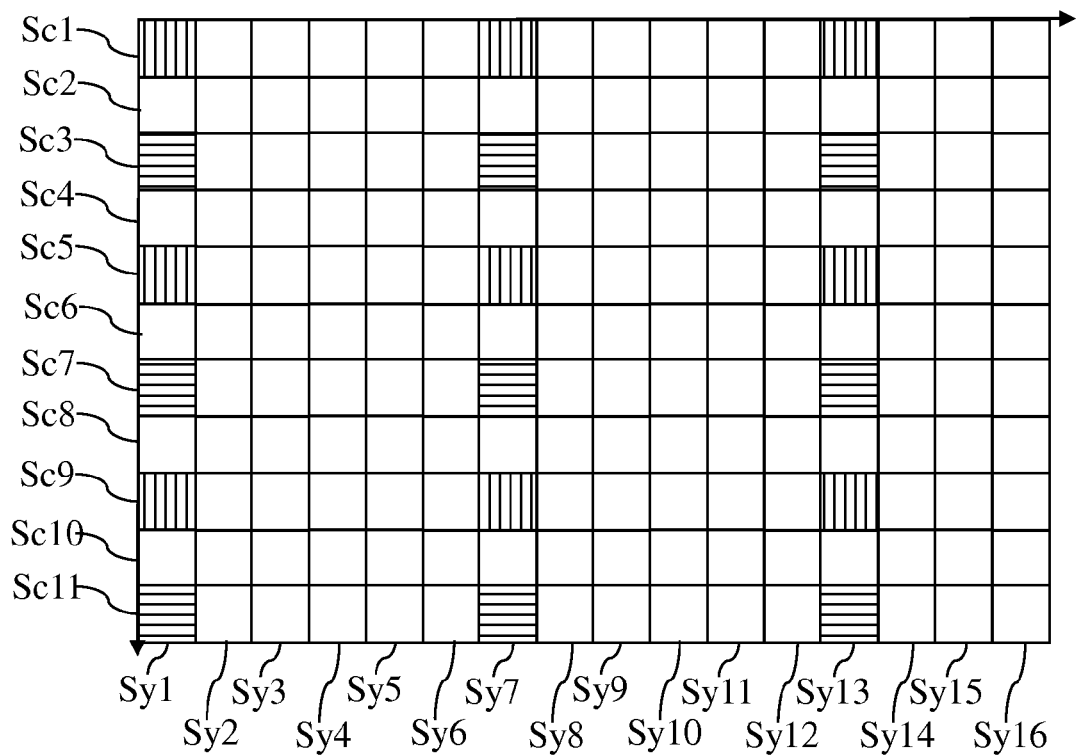
FIG. 6 discloses an example of the multiplexing of pilot sequences and data when multiple input transmission scheme is used according to the present invention.

In another mode of realization of the present invention, the pilot sequences are frequency multiplexed on the transmit antennas as shown in FIG. 6.

FIG. 6 discloses an example of the multiplexing of pilot sequences and data when multiple input multiple output transmission scheme is used according to the present invention.

On the horizontal axis, representing the time domain, plural SC-OFDM symbols noted Sy1 to Sy16 are represented.

The vertical axis represents the subcarriers Sc1 to Sc11 on which SC-OFDM symbols are mapped.

FIG. 6 shows an example wherein eleven subcarriers are shown. The present invention is also applicable when there are more or less subcarriers.

The squares filed by vertical hatching represent, for a first transmit antenna, the subcarriers on which, for a given SC-OFDM symbol, at least one pilot sequence is mapped.

The squares filed by vertical hatching represent, for a second transmit antenna, the subcarriers on which, for a given SC-OFDM symbol, at least one other pilot sequence is mapped, the other pilot sequence may be or not different from the or each pilot sequence mapped on subcarriers for the first transmit antenna.

It has to be noted here that for at least one symbol Sy1, Sy7 and Sy13, the power allocated to subcarriers may be not equally distributed.

For example, for subcarriers Sc2, Sc4, Sc6, Sc8 and Sc10, the power allocated to these subcarriers is higher than the power allocated to subcarriers Sc1, Sc3, Sc5, Sc7, Sc9 and Sc11 of at least one SC-OFDM symbol Sy1, Sy7 and Sy13 i.e. more power is allocated for data than for pilot sequence or sequences.

For example, for subcarriers Sc1, Sc3, Sc5, Sc7, Sc9 and Sc11, the power allocated to these subcarriers is higher than the power allocated to subcarriers Sc2, Sc4, Sc6, Sc8 and Sc10 of at least one SC-OFDM symbol Sy1, Sy7 and Sy13 i.e. more power is allocated for pilot sequence or sequences than for data.

The other squares represent the subcarriers on which data are mapped.

In the Example of FIG. 6, within six SC-OFDM symbols, one SC-OFDM symbol is composed of at least one shifted pilot sequence which is mapped on one subcarrier on two of the subcarriers on which the SC-OFDM symbol is mapped. Data are mapped on the other subcarriers.

The SC-OFDM symbols Sy1, Sy7 and Sy13 are composed of at least one pilot sequence which is mapped on the subcarriers Sc1, Sc5 and Sc9, of at least one pilot sequence which is mapped on the subcarriers Sc3, Sc7 and Sc11 and of data which are mapped on subcarriers Sc2, Sc4, Sc6, Sc8 and Sc10.

It has to be noted here that, for at least two hybrid SC-OFDM symbols, the same pilot sequence or pilot sequences may be mapped on the subcarriers Sc1, Sc3, Sc5, Sc7, Sc9 and Sc11.

It has to be noted here that, for at least one hybrid SC-OFDM symbol, the pilot sequence or sequences which is or are mapped on subcarriers may be different from the pilot sequence or sequences which is or are mapped on at least one other hybrid SC-OFDM symbol.

The SC-OFDM symbols Sy2 to Sy6, Sy8 to Sy12 and Sy14 to Sy16 are composed of data which are mapped on subcarriers Sc1 to Sc11.

It has to be noted here that data transferred through one antenna may be different from data transferred through the other antenna.

Figure 7:
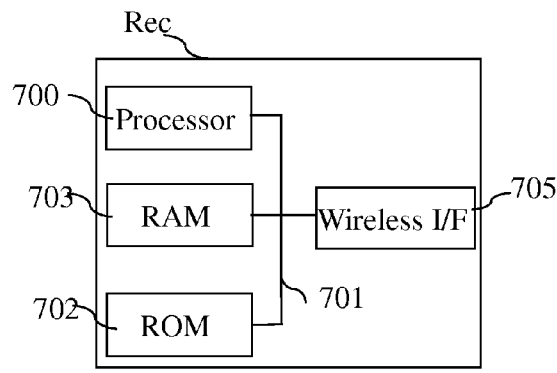
FIG. 7 is a diagram representing the architecture of a receiver in which the present invention is implemented.

FIG. 7 is a diagram representing the architecture of a receiver in which the present invention is implemented.

The receiver Rec has, for example, an architecture based on components connected together by a bus 701 and a processor 700 controlled by the program as disclosed in FIG. 10.

It has to be noted here that the receiver Rec may have an architecture based on dedicated integrated circuits.

The bus 701 links the processor 700 to a read only memory ROM 702, a random access memory RAM 703 and a wireless interface 705.

The memory 703 contains registers intended to receive variables and the instructions of the program related to the algorithm as disclosed in FIG. 10.

The processor 700 controls the operation of the wireless interface 705.

The read only memory 702 contains instructions of the program related to the algorithm as disclosed in FIG. 10, which are transferred, when the receiver Rec is powered on, to the random access memory 703.

The wireless interface 705 comprises means for transferring multiplexed data and pilot sequences according to the invention to receivers Rec.

Figure 8:
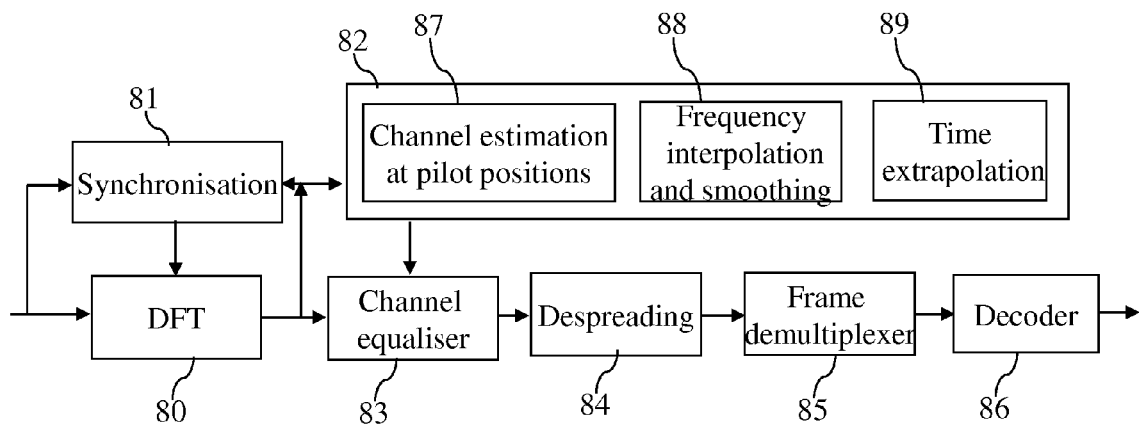
FIG. 8 discloses a block diagram of components of the wireless interface of the receiver.

The wireless interface 705 comprises components as disclosed in FIG. 8.

FIG. 8 discloses a block diagram of components of the wireless interface of the receiver.

FIG. 8 discloses an example of implementation of the present in the frequency domain.

The wireless interface comprises a synchronisation module 81 which is in charge of synchronising a DFT module 80 and a channel estimation module 82 of the wireless interface 705 on the received symbols.

The DFT module 80 transforms the received symbols from the time domain to the frequency domain.

The transformed received symbols are provided to the channel estimation module 82 and to a channel equalizer 83.

The channel estimation module 82 comprises a channel estimation at pilot sequence positions module 87, a frequency interpolation and smoothing module 88 and a time extrapolation module 89.

The channel estimation module 87 estimates at pilot sequence positions, according to the example of FIG. 5, the channel on the subcarriers Sc1, Sc3, Sc5, Sc7, Sc9 and Sc11.

For symbol containing pilots and data, i.e. hybrid symbol, the channel response is estimated for all subcarriers by performing, by the frequency interpolation and smoothing module 88, an interpolation in the frequency dimension in order to allow an estimate of the channel on the subcarriers supporting data. The frequency interpolation and smoothing module 88 performs a frequency domain smoothing in order to reduce the estimation noise. The same filter, for example a Wiener filter, may be used for both operations.

The time extrapolation module 89 estimates, for the other symbols, the channel response at least from the estimation performed for the hybrid symbol or for the estimations performed for the hybrid symbols.

For example, the time extrapolation module 89 performs a time interpolation for the symbols which are comprised between two hybrid symbols or duplicates the estimation performed for one hybrid symbol or plural hybrid symbols for the other symbols composed of discrete Fourier transformed data only.

It has to be noted that the processing order of the modules 88 and 89 may be inversed.

It has to be noted here that the processing made by the modules 88 and 89 may be merged.

The output of the channel estimation module 82 is provided to the channel equaliser 83 which performs a channel equalisation on the transformed received symbols.

The equalised symbols are de-spread by a de-spreading module 84.

The output of the de-spreading module 84 is connected to a frame demultiplexer 85 which performs an inverse operation as the one executed by the Frame builder 32 of FIG. 3. The frame demultiplexer 85 demultiplexes data symbols and pilot sequences and de-maps the data and pilot sequences on subcarriers comprised in the frequency band.

The output of the frame demultiplexer 85 is connected to a decoder 86 which at least de-interleaves and decodes data.

It has to be noted here that if different powers are allocated for subcarriers according to the fact that pilot sequence or sequences or data are mapped on them, channel equalizer 83 or channel estimation module 82 modifies the channel estimate by taking into account the different allocated powers.

FIG. 9 discloses an example of an algorithm executed by a source according to the present invention.

The present algorithm is executed by the processor 200 of the source Src.

At step S900, the processor 200 is informed that data have to be transferred by the source Src.

At next step S901, the processor 200 commands the process of data to be transferred.

Data to be transferred are interleaved, coded and organized as symbols.

In a variant of realization, a constellation shift of a predetermined value of degrees is performed for one elementary symbol in two.

If the modulation is a Quadrature Phase Shift Keying modulation, the predetermined value is equal to forty five.

The data symbols are spread from the time domain to the frequency domain.

At next step S902, the processor 200 obtains at least one pilot sequence. Each pilot sequence has the property that almost fixed amplitudes are obtained also after performing a DFT over such sequence.

According to a particular mode of realization of the present invention, each obtained pilot sequence is shifted by half a sampling period duration.

At next step S903, the processor 200 commands the multiplexing of data and the at least one pilot sequence.

According to the invention, within given number of symbols, one hybrid symbol which is composed of at least one pilot sequence which is mapped on one subcarrier in two of at least a part of subcarriers on which the hybrid symbol is mapped and of discrete Fourier transformed data which are mapped on at least subcarriers comprised between two subcarriers on which the at least one pilot sequence is mapped. The other symbols are composed of discrete Fourier transformed data only.

At next step S904, the processor 200 commands an orthogonal frequency division multiplex modulation of the symbols in order to form the orthogonal frequency division multiplex modulated symbol, and commands the transfer of the orthogonal frequency division multiplex modulated symbols.

FIG. 10 discloses an example of an algorithm executed by a destination according to the present invention.

The present algorithm is executed by the processor 700 of the receiver Rec.

At step S100, the processor 700 is informed of the reception of signals representative of received symbols.

At next step S101, the processor 700 commands the process of the received symbols. The received symbols are transformed from the time domain to the frequency domain using a DFT and are provided to the channel estimation module.

At next step S102, the processor 700 commands for at least one hybrid symbol which is composed of at least one pilot sequence which is mapped on one subcarrier in two of at least a part of subcarriers on which the hybrid symbol is mapped and of discrete Fourier transformed data which are mapped on at least subcarriers comprised between two subcarriers on which the at least one pilot sequence is mapped, an estimate of the link on subcarriers on which the at least one pilot sequence is mapped.

At next step S103, the processor 700 commands, for the at least one hybrid symbol which is composed of at least one pilot sequence which is mapped on one subcarrier in two of at least a part of subcarriers on which the hybrid symbol is mapped and of discrete Fourier transformed data which are mapped on at least subcarriers comprised between two subcarriers on which the at least one pilot sequence is mapped, an estimate of the channel response for all subcarriers by performing a frequency interpolation and smoothing in order to allow an estimate of the channel on the subcarriers on which data are mapped. The frequency interpolation and smoothing performs a frequency domain smoothing in order to reduce the estimation noise.

At next step S104 the processor 700 commands an extrapolation, for the other symbols, of the channel response at least from the estimation performed for the hybrid symbol or for the estimations performed for the hybrid symbols.

For example, a time interpolation is performed for the symbols which are comprised between two hybrid symbols or a duplication of the estimation performed for one hybrid symbol or plural hybrid symbols is executed for the symbols composed of discrete Fourier transformed data only.

It has to be noted that the order of the steps S103 and S104 may be inversed or the steps S103 and 104 may be merged.

Naturally, many modifications can be made to the embodiments of the invention described above without departing from the scope of the present invention.

The invention claimed is:

1. A method for estimating a wireless link between a source and a receiver using a single carrier orthogonal frequency division multiplex scheme and executed for a given number of single carrier orthogonal frequency division multiplex symbols, the method comprising:
    transforming received symbols from a time domain to a frequency domain;
    for at least one hybrid symbol, which is composed of
        at least one pilot sequence, which is mapped on one subcarrier out of every two subcarriers on which the hybrid symbol is mapped, and
        discrete Fourier transformed data which are mapped on at least the one subcarrier on which the at least one pilot sequence is mapped,
    estimating a link on the subcarriers on which the at least one pilot sequence is mapped, the at least one pilot sequence having the property that variations of amplitudes obtained after performing a discrete Fourier transform over said at least one pilot sequence are limited;
    for the at least one hybrid symbol, estimating a channel response for all subcarriers by performing a frequency interpolation and smoothing in order to allow an estimate of the channel on the subcarriers on which the discrete Fourier transformed data are mapped; and
    for symbols other than the at least one hybrid symbol, estimating the channel response at least from the estimation performed for the at least one hybrid symbol.

2. The method according to claim 1, wherein the at least one pilot sequence is time shifted by half a sampling period.

3. A non-transitory computer readable medium storing instructions or portions of code that, when executed by a computer, causes the computer to execute the steps of the method according to claim 1.

4. A device for estimating a wireless link between a source and at least one receiver using a single carrier orthogonal frequency division multiplex scheme, the device comprising:
    means for transforming the received symbols from a time domain to a frequency domain;
    means for estimating a link on subcarriers on which at least one pilot sequence is mapped, the at least one pilot sequence being included in at least one hybrid symbol which is composed of
        the at least one pilot sequence, which is mapped on one subcarrier in out of every two subcarriers on which the hybrid symbol is mapped, and
        discrete Fourier transformed data, which are mapped on at least the one subcarrier on which the at least one pilot sequence is mapped, the at least one pilot sequence having the property that the variations of amplitudes obtained after performing a discrete Fourier transform over said at least one pilot sequence are limited;
    the means for estimating further estimates a channel response for all subcarriers by performing a frequency interpolation and smoothing in order to allow an estimate of the channel on the subcarriers on which the discrete Fourier transformed data are mapped; and
    the means for estimating further estimates the channel response for symbols other than the at least one hybrid symbol at least from the estimation performed for the at least one hybrid symbol.

* * * * *